(No Model.) 9 Sheets—Sheet 1.
W. M. STEINLE.
CIGAR BUNCH MACHINE.

No. 479,472. Patented July 26, 1892.

Fig 1.

Witnesses:
Chas. E. Gaylord
Clifford N. White

Inventor:
William M. Steinle,
By Dyrenforth & Dyrenforth
Attys.

(No Model.) 9 Sheets—Sheet 8.
W. M. STEINLE.
CIGAR BUNCH MACHINE.

No. 479,472. Patented July 26, 1892.

Witnesses:
Inventor:
William M. Steinle,
By Dyrenforth & Dyrenforth,
Attys.

THE NORRIS PETERS CO., PHOTO-LITHO., WASHINGTON, D. C.

UNITED STATES PATENT OFFICE.

WILLIAM M. STEINLE, OF CHICAGO, ILLINOIS, ASSIGNOR TO BERNARD GRADLE AND NICOLAS STROTZ, OF SAME PLACE.

CIGAR-BUNCH MACHINE.

SPECIFICATION forming part of Letters Patent No. 479,472, dated July 26, 1892.

Application filed February 12, 1891. Serial No. 381,147. (No model.)

*To all whom it may concern:*

Be it known that I, WILLIAM M. STEINLE, a citizen of the United States, residing at Chicago, in the county of Cook and State of Illinois, have invented a new and useful Improvement in Cigar-Bunch Machines, of which the following is a specification.

My invention relates to improvements in a machine employed in the manufacture of cigars for gathering the filler and shaping the tobacco thereof and binding it to form the bunch preparatory to the final operation of covering it with the wrapper, which operation is usually done by hand.

My object is to provide a machine of the above class in the use of which the operation of bunching the tobacco or "filler" may be accomplished with great rapidity and economy of labor; in which, further, "cigar-bunches" of any desired size and shape may be formed, and which may, still further, be employed for forming cigar-bunches of either long or short filler.

Whatever is shown and claimed in my former application, Serial No. 304,591, filed March 25, 1889, I do not desire to claim in this.

The general plan and operation of my machine to form cigar-bunches when long filler is employed are as follows: The tobacco is crowded into an initial receptacle or apportioning-mold of the proper shape and capacity and provided with a trap-door on its under side, which receptacle is mounted upon a suitable carrier to travel, at determined intervals, back and forth between the filling-operator's table and its place in the machine. When in the last-named position, an ejecting-plunger descends through the receptacle and forces the filler through the trap-door onto the "forming-belt," where it rests in the grasp of a loop or pocket formed by the belt. While the plunger is descending a "binder" or inner wrapper for the cigar is fed at one edge into the path of the descending filler, and descends with that edge foremost with the filler into the pocket. The forming-belt is secured at opposite ends upon a vertically-disposed rocking frame fulcrumed at its lower end, and the belt passes over a stationary roller supported on the main frame, which roller is close to the path of the upper surface of the rocking frame. The rocking frame oscillates backward, causing the filler to be rolled up in its binder, and when the edge of the rocking frame has passed the roller the loop of the forming-belt opens and the bunch is discharged upon the end of a ram or ejector between the open pivotal jaws of a shaper which is then in the vertical plane. The jaws of the shaper close against opposite sides of the bunch, and the shaper turns to the horizontal plane and travels through a quarter-circle to a position at right angles to its former position, when the ram is actuated to eject the bunch from the shaper and crowd it into one of the molds of an ordinary or suitable mold-board, which is caused automatically to assume a position to receive the bunch. When short filler is employed, the receptacle or mold on the carriage is caused to remain permanently in its position in the machine and the tobacco is fed to it automatically at desired intervals and in desired quantities from a hopper above.

Bearing in mind the general operation of the machine set forth above, the specific mechanisms which produce the required movements at the proper times will be readily understood from the following description, reference being had to the accompanying drawings, in which—

Fig. 5, a plan sectional view taken on line 5 5 of Fig. 1; Fig. 15, a broken section taken on line 15 of Fig. 14 and viewed in the direction of the arrow.

A represents the lower main portion of the frame of the machine, and A' the upper part thereof, certain portions of the frame which have no functions to perform beyond those of supports or braces being designated by the reference-letter $t$ to prevent confusion thereof with other parts.

B is a drive-shaft supported in suitable bearings on the frame and carrying at one end a drive-pulley X and fly-wheel Y and at its opposite end a crank $s$.

A treadle C, extending to the front side of the machine, is fulcrumed upon a rock-shaft $t'$ in the lower part of the frame. Extending upward from the treadle and rigidly connected therewith at its fulcrum is an arm $r$, and connected also rigidly with the treadle between its fulcrum and forward end is a brace-rod $r'$, the arm $r$ and rod $r'$ being held together in rigid relation at their upper ends by a short rod $r^2$, which extends in a plane parallel to the shaft $t'$. Pivoted at one end to the rod $r^2$ is a link $r^3$, which when the machine is to be operated by foot-power connects at its opposite end, pivotally, with the crank $s$ on the drive-shaft, as shown by dotted lines in Fig. 4.

Figure 4:
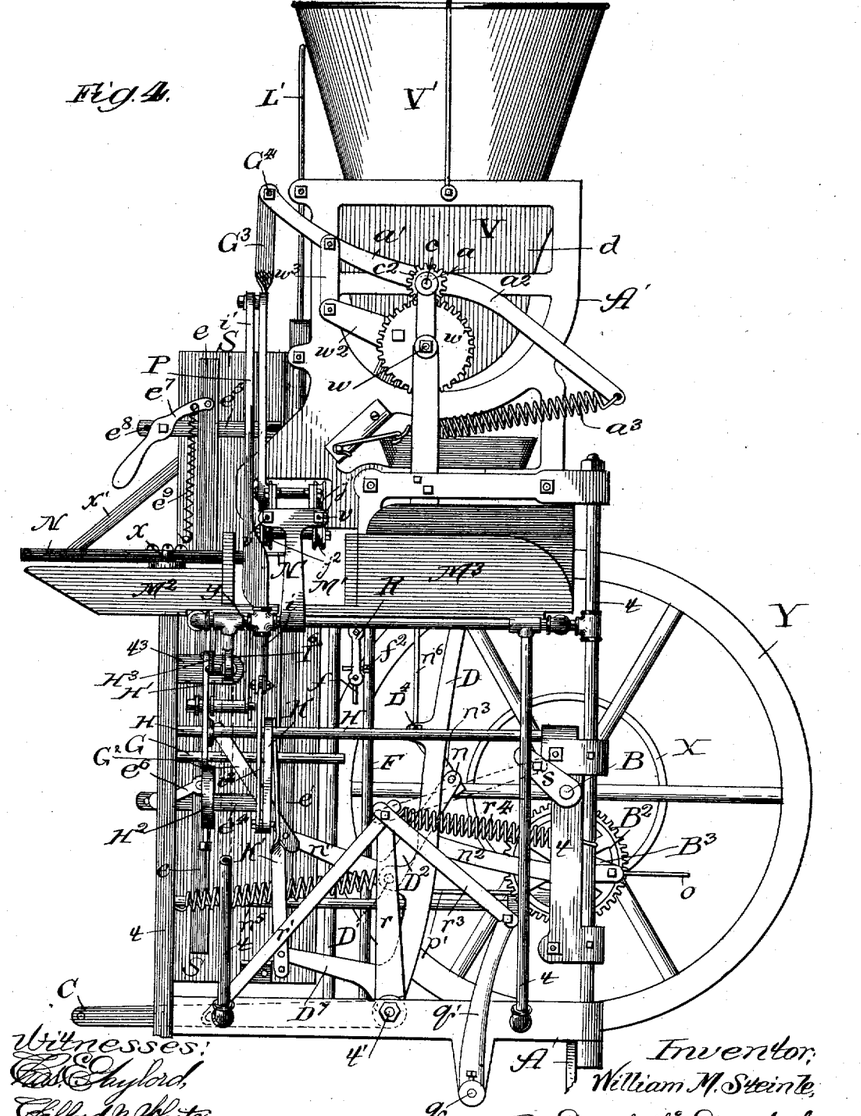
Fig. 4, a similar view of the right-hand side thereof.

When the machine is to be operated from a power-shaft, it is belted thereto at its pulley X, and the link $r^3$, instead of connecting with the crank $s$, is adjusted, as shown by full lines in Fig. 4 and other figures, to connect the treadle with the operating mechanism of a clutch, which latter is located between the pulley X and the fly-wheel Y on the one hand and the drive-shaft B on the other hand. A rock-shaft $q$, forming part of the clutch-operating mechanism, extends through and beyond bearings on the under side of the frame and carries at one end an arm $q'$, which connects pivotally at its upper end with the link $r^3$. Upon the opposite end of the shaft $q$ is an arm $q^2$, which projects upward through the cam-slot $q^4$ of a shipper $q^3$. The shipper $q^3$ is attached at one end to the frame and engages the clutch $q^5$ at its opposite end, whereby, with its lateral vibration, it operates to throw the clutch into and out of engagement. A spiral spring $r^4$ is connected at its opposite ends, respectively, with the rod $r^2$ and the back part of the frame A, and it operates normally to maintain the treadle raised and the clutch out of engagement, thereby releasing the drive-shaft B from engagement with the pulley X and fly-wheel Y, which turns with the pulley.

To bring about engagement between the shaft B and the pulley X—that is to say, to start the machine—the operator places his foot upon the treadle and swings the latter down, which causes the rock-shaft $q$, through the medium of the link $r^3$ and arm $q'$, to be rocked forward and swing the arm $q^2$ in the direction away from the clutch, whereby it bears against the side of the cam-slot $q^4$ and vibrates the shipper $q^3$ to produce engagement of the clutch-mechanism, which thus causes the shaft B to rotate with the power-pulley. Any one of several well-known clutch mechanisms located between the power-pulley and drive-shaft and operating as described will answer the purpose, and it is not thought necessary, therefore, to describe in detail the clutch mechanism shown in the figures. When the operator removes his foot from the treadle, it is raised by the action of the spring $r^4$, causing the shaft $q$ to rock backward and swing the arm $q^2$ in the direction of the clutch mechanism, whereby the shipper releases the latter, thus disengaging the shaft B from the pulley and stopping the machine.

B' is a short counter-shaft, journaled in the frame below the shaft B and provided with a gear-wheel B², which meshes with a pinion $s'$ on the shaft B. On the end of the counter-shaft B' is a crank B³.

D is a vertically-disposed rocking frame, fulcrumed at its lower end upon the shaft $t'$. Extending between the side bars of the frame is a round bearing-bar D' and above the latter a bar D⁴. Upon the bar D' is fulcrumed a bell-crank lever D², having arms $n$ and $n'$ at right angles to each other. A link $n^2$ is pivotally connected at opposite ends, respectively, with the crank B³ and arm $n$, about midway of the length of the latter. Adjustably secured to the upper end of the arm $n$ is a catch-piece $n^3$, (of the form shown in Fig. 6,) which extends below the bar $D^4$ and is provided beyond the said bar with a projection $n^4$ to engage the bar $D^4$ in the backward reciprocation of the lever $D^2$, as hereinafter described. A spring $n^5$, connected at opposite ends, respectively, with the front of the frame A and bar $D'$, tends normally, to maintain the rocking frame D forward. Secured to the upper end of the rocking frame is a curved cigar-rolling table $m$, which extends forward therefrom in the arc of a circle of which the shaft $t'$ is the center. A rod $n^6$, extending between the bar $D^4$ and rolling table, affords an additional support for the front portion of the latter, and may be adjusted to raise or lower the front end of the table when desired. Between the rear upper end portion of the rocking frame and the adjacent edge of the table $m$ is an opening $m'$. At opposite ends of the opening $m'$ are two L-shaped plates $l$. In one flange of each plate $l$ is a longitudinal slot $l'$, (see Fig. 5,) through which the plates respectively are adjustably secured by set-screws $l^2$ upon the upper surface of the rocking frame at opposite ends of the opening $m'$. The other flanges of the plates $l$ extend vertically downward through the opening $m'$ and afford adjustable end walls for the latter. Extending across the rear edge portion of the top of the rocking frame is an angle-plate $m^2$, secured in place and projecting at one side upward at right angles to the top of the rocking frame. A slack forming belt or apron $k$ is removably secured at one end upon the outer surface of the angle-plate $m^2$ by a clamping-strip $m^3$, and is removably secured at its opposite end to the under side of the forward edge of the table $m$ by a clamping-strip $m^4$. Between its ends the forming-belt extends over a bunch-roller $z$, mounted in the forward end of a frame $z'$, which is fulcrumed to the under side of the frame $A'$ at $z^2$ and extends into slotted guides $z^3$ at its rear end on the frame $A'$, in which it may be raised or lowered to adjust the roller $z$ with relation to the platform $m$, and, secured in its adjusted position, the clamping-strip $m^3$ is held to the angle-plate $m^2$ by screws $m^6$, which pass through both plates near their ends beyond the edges of the belt. The screws project a short distance beyond the face of the angle-plate, and by their contact with the ends of the forming-roll $z$ limit the forward oscillation of the rocking frame D, as hereinafter described.

E (see Figs. 2, 24, and 25) is a horizontal rock-shaft extending from the rear toward the front of the machine in journals near the left-hand side of the frame A, and provided at its rear end with a pin $E'$. Mounted upon the shaft E to slide longitudinally thereon is a plate $p$, carrying a plate $o$, provided with a cam-slot $o'$, through which the pin $E'$ extends. A link $p^2$ connects the sliding plate $p$ pivotally with the rocking frame D. F is a vertical rock-shaft journaled in the frame A to one side of the shaft E, and it is provided with a crank $F'$. A link $p'$, pivotally secured at opposite ends to the plate $p$ and crank $F'$, connects the rock-shaft F with the plate $p$.

G is a short stationary horizontal shaft supported in the frame at the front of the latter. Fulcrumed at one end upon the shaft G is a lever $G'$, which extends part way across the front portion of the frame to swing in a vertical plane. The lever $G'$ is pivotally connected toward its center with the free end of the arm $n'$ of the bell-crank lever $D^2$ by a link $G^2$. Connected pivotally with the free end of the lever $G'$ is a vertical and longitudinally-movable bar $G^3$, provided at its upper end with a laterally-projecting pin $G^4$. The pin $G^4$ terminates midway of the front of the main part of the frame, where it carries a pivotal link $L^2$, which at its lower end connects adjustably and pivotally with the stem $L'$ of a vertically-reciprocating discharger or plunger L.

H is a stationary horizontal shaft (see Fig. 4) at the right-hand side of the frame A. A lever $H'$ is fulcrumed between its ends upon the shaft H to swing in a vertical plane and is provided at its fulcrum with a weighted extension $H^2$. The lever $H'$ is in the plane of the lever $G'$, and one of its arms extends normally downward across the path of the swinging end of the lever $G'$.

Figure 1:
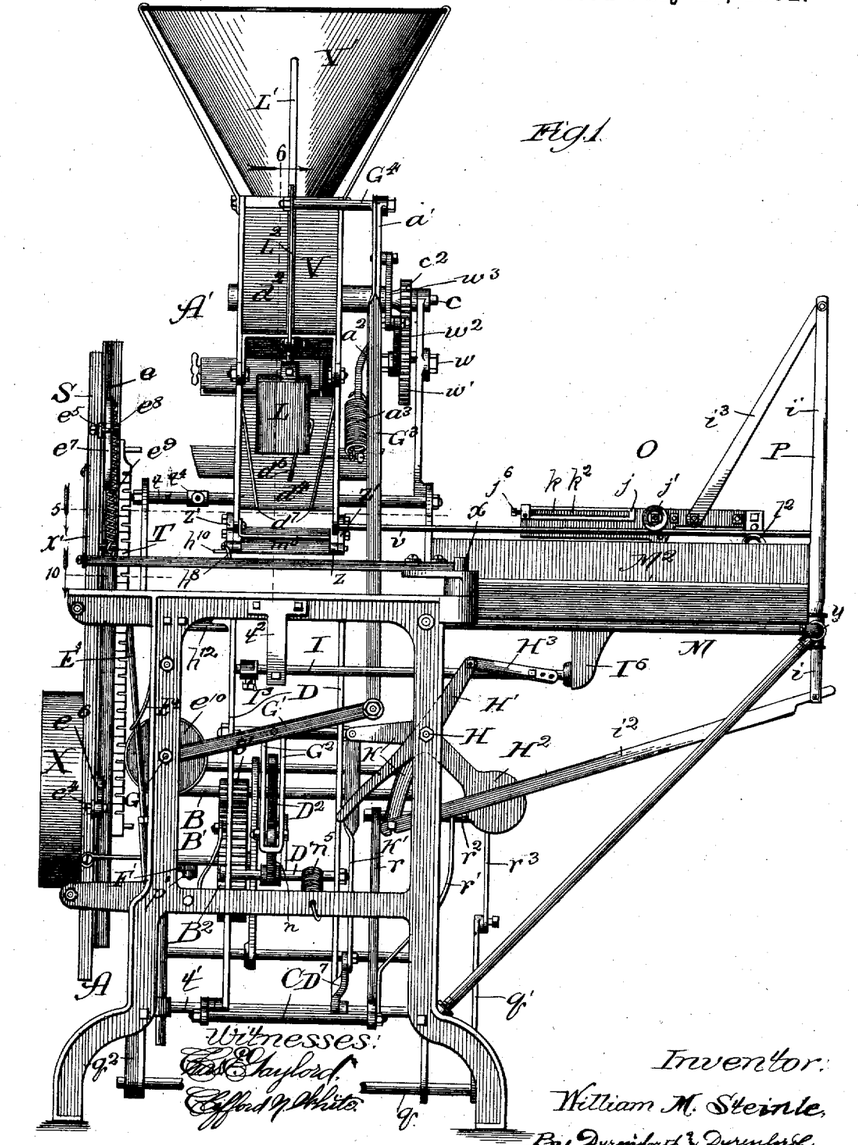
Figure 1 is a view in front elevation of the machine.
Figures 10, 11, 12, 13, 14:
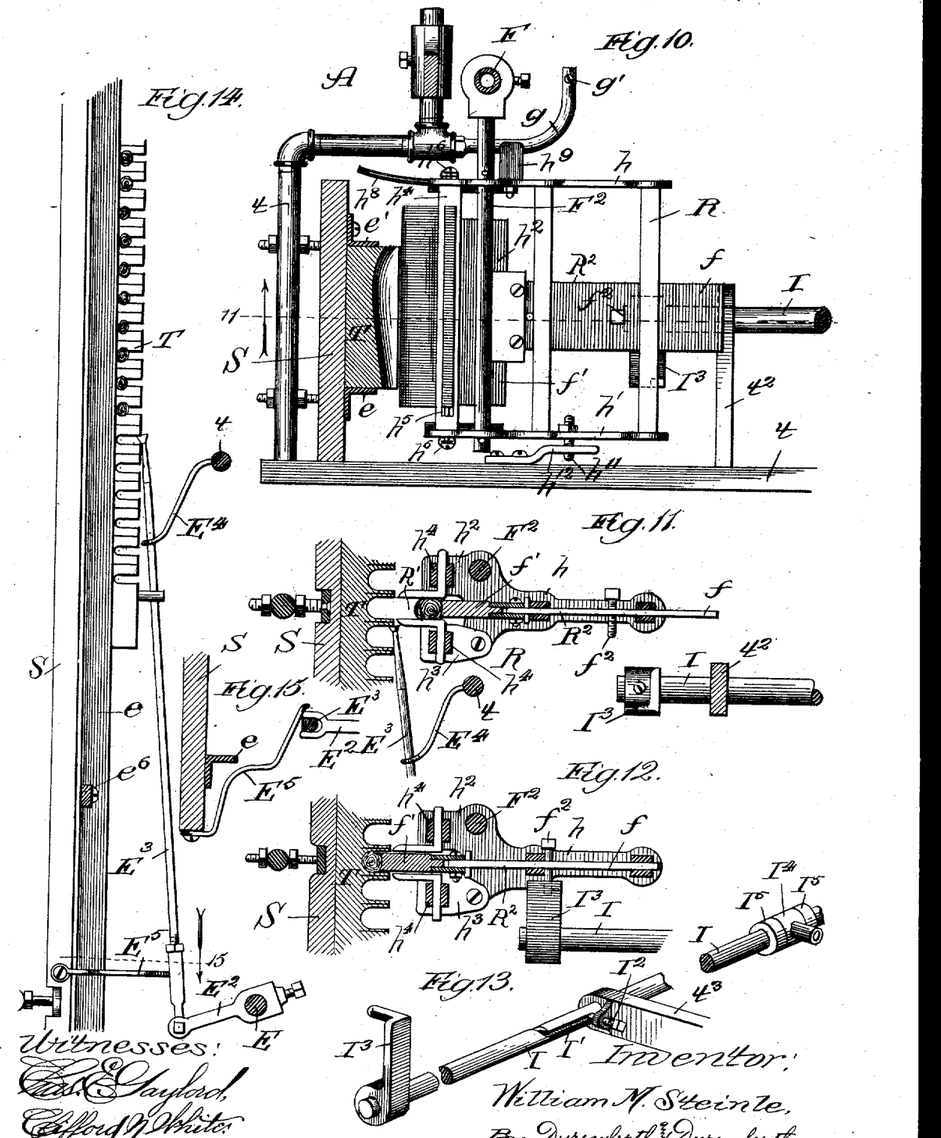
Fig. 10, an enlarged section taken on line 10 of Fig. 1, viewed in the direction of the arrow and illustrating a fifth stage in the operation.
Fig. 11, a section taken on line 11 of Fig. 10 and viewed as indicated.
Fig. 12, a view in the same direction and on the same line as Fig. 11, but showing the positions of the parts in the sixth and last stage of the operation.
Fig. 13, a broken perspective view of a rock-shaft detail.
Fig. 14, an enlarged broken view in elevation of a part of the machine, showing the mold-board and its feed mechanism.

I is a horizontal and reciprocating rock-shaft mounted in bracket-bearings $t^2$ $t^3$ on the main frame and having limited longitudinal movement therein. The shaft I is provided with a longitudinally-extending groove $I'$, turned at its end to afford a cam, as shown in Fig. 13, and on the bracket $t^3$ is a set-screw $I^2$, which projects into the groove $I'$ and causes the shaft I to turn as the cam end of the groove approaches and leaves the set-screw $I^2$ in the longitudinal movement of the shaft, as hereinafter described. The shaft I carries at one end a laterally-extending catch-piece $I^3$, and near its opposite end is a loose sleeve $I^4$ between two fixed collars $I^5$ upon the shaft, which hold the sleeve against longitudinal play. The sleeve $I^4$ is pivotally connected with the upper end of the lever $H'$ by a link $H^3$. On the frame of the machine and extending downward into the path of one end of the shaft I is a cushioned stop $I^6$, (see Figs. 1 and 2,) which limits the movement of the shaft in that direction.

A bell-crank lever K, fulcrumed upon the shaft H adjacent to the lever $H'$, has one arm extending in a direction downward from the shaft H and another or upper arm extending in a direction nearly at a right angle to the first-named arm. The upper arm of the lever K is pivotally connected by means of a rod $K'$ with an arm $D^7$ of the rocking frame D, which projects forward from the latter near its fulcrum. (See Fig. 4.)

Supported by the frame A, at the right-hand side of the latter, is a table M, affording a central platform $M'$ and two platforms $M^2$ and $M^3$ to the front and rear, respectively, of the platform M' in the same plane with the latter and separated from it by partitions. At the front of the frame A, and pivoted thereto at $x$ to swing in a horizontal plane, is a table N, upheld at the end opposite its pivot and maintained closed against the machine by a latch-bar $x'$. Fastened upon the table N, and projecting beyond the inner edge thereof nearly to the path of the plunger L, is a plate N'.

A horizontal track, comprising two parallel rods $v$, is connected at one end to the frame which supports the table M and at its opposite end to the frame A', being supported to extend longitudinally and centrally of the platform M' in a plane a short distance above the latter. Mounted upon the track $v$ to travel thereon is the carrier or carriage O, comprising two side bars $j$, (see Fig. 5,) connected together by cross-bars and mounted near its center upon a pair of grooved wheels $j'$, which engage the upper side of the track, and provided at its rear end with a similar pair of wheels $j^2$, which engage the under side of the track. (See Fig. 19.) Forward of the wheels $j'$ the side bars $j$ are provided with coincident narrow longitudinally-extending slots $j^3$, and below the said openings is a trap-door $j^4$, hinged at one side to the lower edge of one of the side bars $j$ (see Fig. 21) and held normally at its opposite side up against the lower edge of the other side bar $j$ by a spring $j^5$.

O' is a receptacle, of which the trap-door $j^4$ constitutes the bottom. It is formed in two sections, each comprising a number of thin L-shaped plates $k$, placed contiguously in a direction crosswise of the carriage-frame to afford a series of downward-extending flanges $k'$, and the sections extend along opposite sides of the frame within the latter. The plates $k$ of the two series collectively produce a mold, their horizontal flanges $k^2$ extending through the slots $j^3$. To afford a receptacle or mold O' of the desired capacity and shape for the filler of the cigar-bunch to be formed, as hereinafter described, a suitable core (not shown) of the desired shape in cross-section is placed between the opposing sections or series of plates $k$, and the latter are pressed with the faces of their flanges $k'$ against the core. The plates $k$ are then secured in their relatively-adjusted positions by means of set-screws $j^6$, which extend from the ends of the bars $j$ into the ends of the slots $j^3$ and compress all the plates of each section together at their flanges $k^2$. The core is then removed, and the edges of the plates afford, collectively, comparatively smooth surfaces, which constitute the inner side faces of the mold. Thus while affording an initial receptacle for the filler the mold also apportions the latter so that when the bunch is shaped it will be of the proper density throughout.

P is a lever fulcrumed at a point $y$, Fig. 4, in about the plane of the top of the platform M', to the outer end of that part of the frame which supports the table M, and having a short downward-projecting arm $i$ and a long upward-projecting arm $i'$. The arm $i$ is pivotally connected to a bar $i^2$, which at its opposite end connects pivotally and removably with the lower arm of the bell-crank lever K. A bar $i^3$ is pivotally connected at opposite ends, respectively, with the free end of the arm $i'$ of the lever P and one of the side bars $j$ of the carriage O, so that the movement transmitted to the lever P by the bell-crank lever K, as hereinafter described, causes the carriage to travel between the position thereof shown in Fig. 1 to its place in the machine, (shown in Fig. 6,) at which point it is stopped by contact of its wheels $j'$ with the side of the frame A' and the mold O' is in a position to receive the plunger L in the downward reciprocation of the latter.

Figures 16, 17, 18, 19, 20, 21:
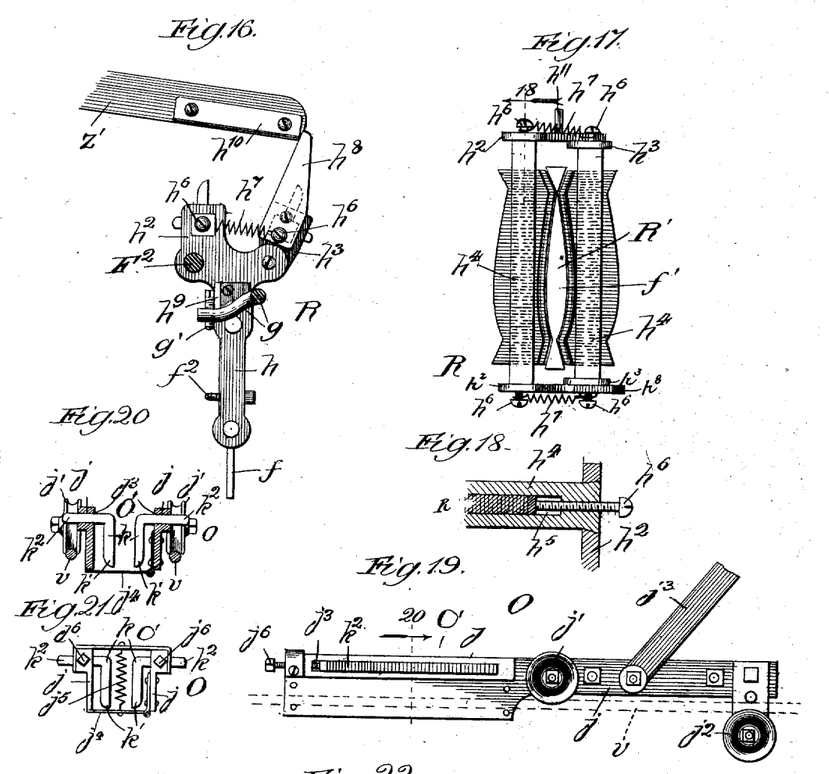
Fig. 16, a section taken on line 16 of Fig. 5, enlarged, and viewed in the direction of the arrow.
Fig. 17, a top plan view of the shaper shown in Fig. 16 with its jaws closed.
Fig. 18, an enlarged broken section taken on line 18 of Fig. 17 and viewed in the direction of the arrow.
Fig. 19, a broken view in elevation of the carriage.
Fig. 20, a section taken on line 20 of Fig. 19 and viewed in the direction of the arrow.
Fig. 21, an end view of the carriage shown in Fig. 19.

R is the carrier-frame of a second mold or shaper R', which receives the cigar-bunch after the latter has been rolled by the forming-belt, as hereinafter described. The frame R is mounted to oscillate upon and travel with a short horizontal shaft $F^2$, (see Fig. 10,) which is secured to the vertical rock-shaft F and extends loosely through openings in the side plates $h$ $h'$ of the carrier-frame. On one end of the frame R are jaws $h^2$ $h^3$, the former of which is fixed and the latter pivotal, to open and close. Extending between the side plates at the free end of each jaw $h^2$ and $h^3$ is a bar $h^4$, (see Figs. 10, 11, and 12,) provided with a longitudinal slot $h^5$. The shaper R', like the mold O', described, is made up of two sections, each formed of thin L-shaped plates, inserted contiguously in the slots $h^5$ and held in place by set-screws $h^6$, which extend through the ends of the bars $h^4$ to the slots $h^5$. The other flanges of the L-shaped plates project forward to produce, collectively, shaping-faces for opposite sides of the cigar-bunch, and they may be adjusted relatively, as in the case of the mold O', to produce a shaper of any desired size and form. The jaws $h^2$ $h^3$ are held normally closed by springs $h^7$, (see Fig. 17,) and at one end of the pivotal jaw $h^3$ is a stop projection $h^8$. Extending from the main frame of the machine, between the shaft F and carrier-frame R, is a horizontal curved and fixed guide-bar $g$, provided at its free end with an upward-projecting stop $g'$. The bar $g$ describes a quarter-circle about the shaft F in an arc of which the shaft F is the center, and at its free end it deflects downward, as shown in Fig. 16. The frame R is pivotally supported by the shaft $F^2$, and being heavier at its rear end its tendency is to turn toward the vertical plane on that shaft. Projecting from the side plate $h$ of the carrier R is a flat-faced lug $h^9$, which rests and slides upon the guide-bar $g$.

Figures 6, 7, 8, 9:
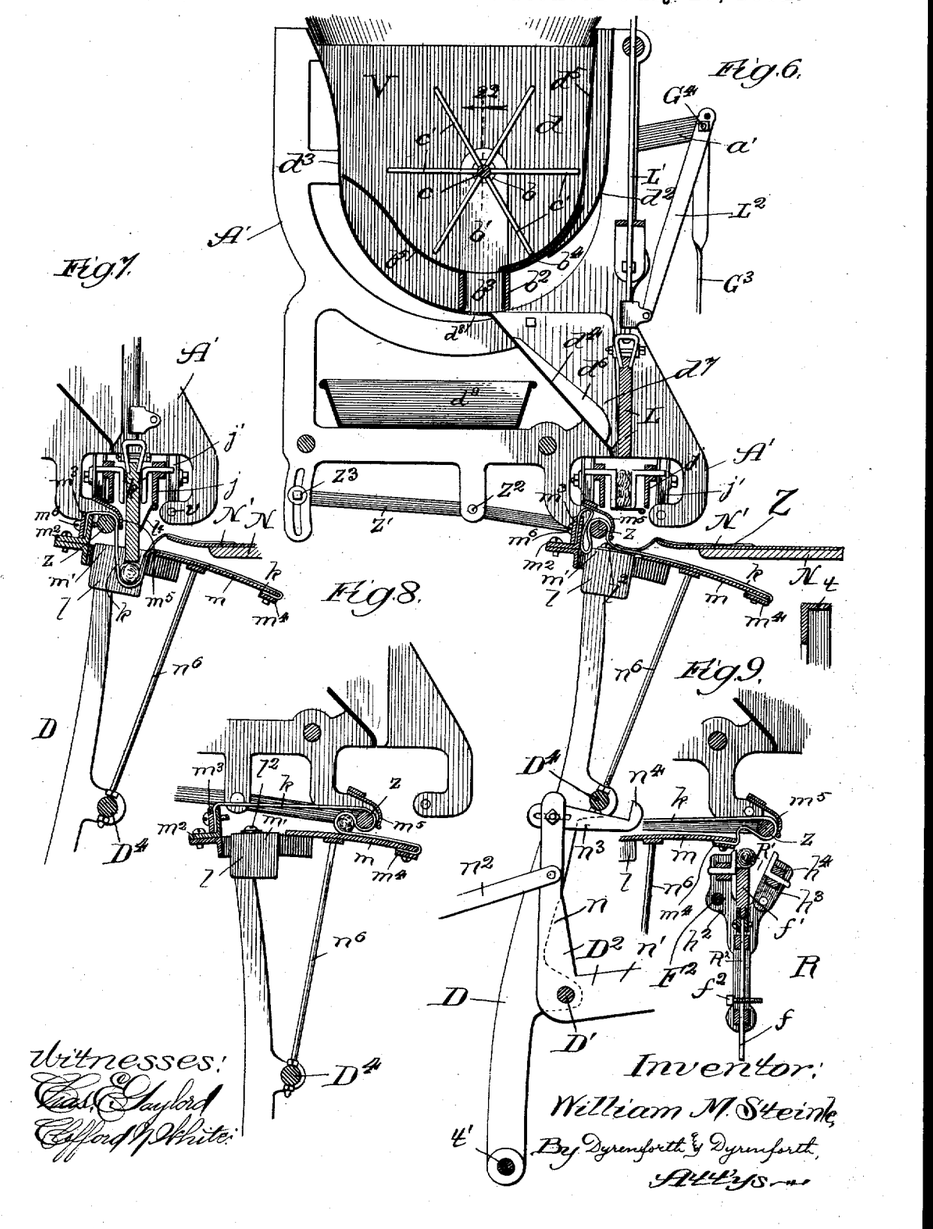
Fig. 6, an enlarged sectional and partly-broken view taken on line 6 of Fig. 1 and viewed as indicated by the arrow, parts being left out for purposes of the illustration, an apportioning mold-receptacle and its carriage supplied with filler for a cigar being shown in position under the plunger with a binder properly fed into the path of the plunger.
Figs. 7, 8, and 9, views showing parts corresponding with parts in Fig. 6 and illustrating, respectively, a second, third, and fourth stage in the operation of forming the bunch.

In traveling from the position shown in Fig. 10 to that shown in Figs. 9 and 16 (which is effected by turning of the rock-shaft F, as hereinafter described) the lug $h^9$, as it rests and slides upon the guide $g$, maintains the carrier R in a horizontal position until the end portion of the guide is reached. When the lug $h^9$ passes the point where the guide $g$ deflects downward, it commences to turn toward the vertical plane, the carrier-frame turning with it, and when the lug $h^9$ strikes the stop $g'$, further turning of the shaft F in the same direction causes the lug $h^9$, by bearing against the stop $g'$, to turn upon end, flatwise against the stop, and swing the carrier to and maintain it in the vertical position. While the carrier is assuming the vertical position the projection $h^8$ strikes a stop $h^{10}$ on the adjusting-frame $z'$, and the jaw $h^3$ is opened. Mounted in the carrier R is a ram or ejector $R^2$, comprising a bar $f$, supported to reciprocate longitudinally in guides in the carrier and having a head $f'$, which conforms substantially in cross-section to the interior of the shaper $R'$, through which it reciprocates. The end or face of the head $f'$ of the ejector $R^2$ is slightly concave and of the shape which the cigar-bunch is to assume. When the carrier R is in the vertical plane, the ejector drops by its own weight to the position shown in Fig. 9, and when the carrier has moved to the opposite limit of its reciprocation (to the position shown in Fig. 10) the movement of the rock-shaft I turns the catch-piece $I^3$ into engagement with a stop $f^2$, projecting from the under side of the ejector, and plunges the latter forward until its head $f'$ projects beyond the shaper $R'$. On the side plate $h'$ is a projection $h^{11}$, which enters the socket of a stop-plate $h^{12}$ on the frame A, whereby the frame R is maintained firm while the ejector is being engaged and advanced by the catch-piece $I^3$ on the shaft I.

Figures 5, 29:
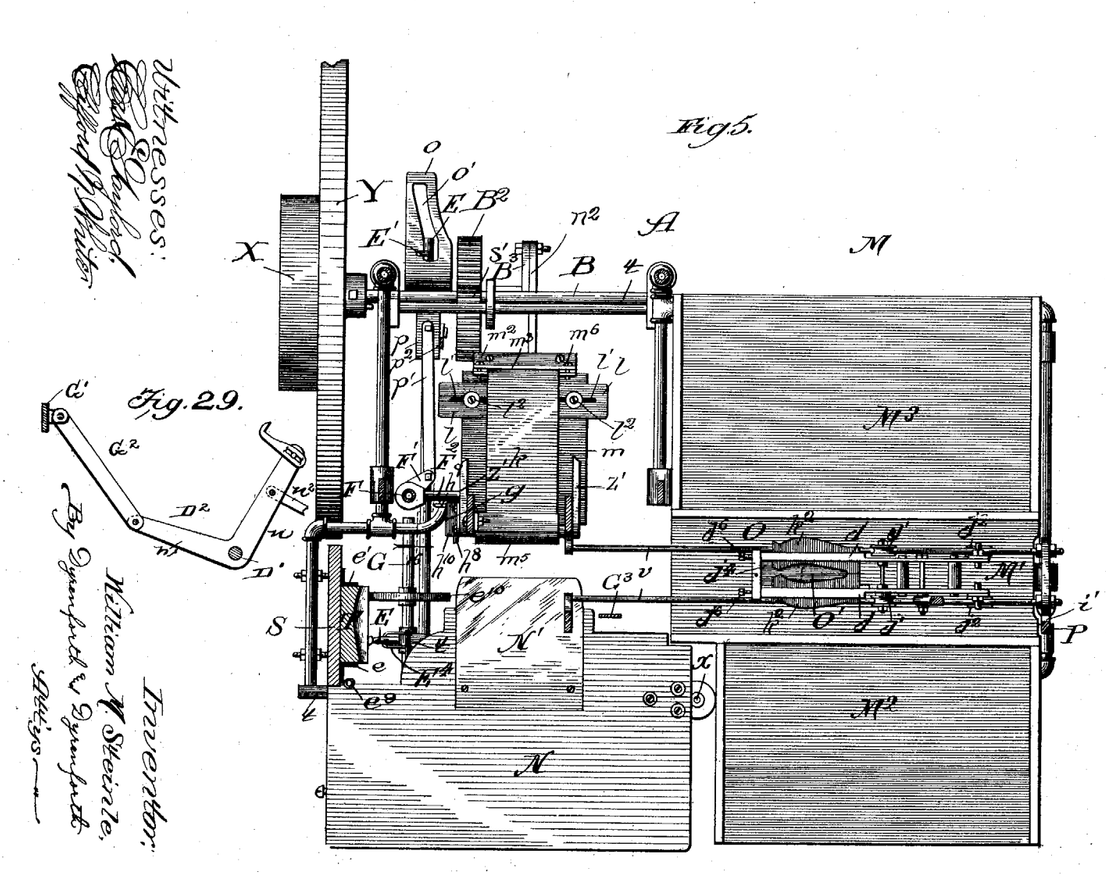

At the left-hand side of the frame A near the front is a vertical board S, provided on its inner face with two guide-bars $e$ $e'$, Fig. 5. The guide $e'$ is adjustable to the right and left, and may be secured in its adjusted position by means of clamp-screws $e^2$, which pass through horizontal elongated slots $e^3$, extending through the board S. (See Fig. 3.) Extending horizontally across the face of the board S in grooves provided at the slots $e^3$ are longitudinally-adjustable bars $e^4$ and $e^5$, respectively, each provided with a longitudinally-extending slot, which coincides with the respective slot $e^3$. The clamp-screws $e^2$ pass through the slots in the bars $e^4$ $e^5$ and serve to fasten the latter, as well as the guide $e'$, in adjusted position. Toward its lower end the guide $e$ is connected with the adjacent end of the bar $e^4$ by a link $e^6$, Figs. 1 and 4, pivoted at opposite ends, respectively, to the said guide and bar and extending in an upward-inclined direction to the guide, and toward its upper end the guide $e$ is pivotally connected to the end of an arm of a lever $e^7$, which is fulcrumed between its ends upon the end of the bar $e^5$ and extends also in an upward-inclined direction to the guide $e$. The other arm of the lever $e^7$ is shaped to afford a handle, which is held normally against a stop $e^8$ on the bar $e^5$ by a spring $e^9$, connected at one end with the lever $e^7$, between its fulcrum and the guide $e$, and at the opposite end to the board S below the lever. The tendency of the spring $e^9$ is therefore to swing the guide $e$ on its link and lever toward the guide $e'$ and resist movement of the guide $e$ in the direction away from the guide $e'$.

T is a block or mold-board of the same construction, substantially, as the mold-boards ordinarily used by cigar-makers. It comprises an oblong rectangular board provided longitudinally with a number of adjacent and crosswise-extending cavities or molds. The cavities should be of the shape and dimensions as the shaper $R'$. The position of the board T is between the guides $e$ $e'$, and to place it in position the operator presses down upon the handle portion of the lever $e^7$ to move the guide $e$ in the direction away from the guide $e'$, and thus enlarge the distance between them, and the board is slid down between the guides from the top. On releasing the lever $e^7$ the guide $e$ bears against the board, which is thus clamped between the guides. Loose upon the shaft G is a wheel $e^{10}$, which is in contact with the face of the mold-board T and operates to maintain the latter firmly against the board S without interfering with its longitudinal movement.

Fastened upon the rock-shaft E, Fig. 14, near its forward end, is a short laterally-extending arm $E^2$, and $E^3$ is a pawl pivoted to the end of the arm $E^2$, comprising an upward-extending rod provided at its upper end with a head which engages the cavities or molds of the mold-board T. Toward its upper end the pawl passes through a guide-loop in the end of a stationary stirrup-piece $E^4$, extending from an adjacent part of the frame A. The rocking of the shaft E causes the pawl to be lowered and raised alternately and in its rise to engage at its head a cavity in the mold-board T and raise the latter the distance of one mold, whereby the mold next above that engaged by the pawl $E^3$ in its rise is brought into the plane of the ejector $f$, so that the head $f'$ of the latter may enter it, all as hereinafter described. Secured at one end to the side of the board S, near the bottom, is a spring-finger $E^5$, bent, as shown in Fig. 15, to extend close to the guide $e$ and in contact at its free end with the pawl $E^3$. As the guide $e$ is moved to one side, as described, to admit the insertion of the mold-board it strikes the spring-finger $E^5$, causing the latter to swing the pawl $E^3$ backward on its pivot, whereby its head is maintained out of the path of the descending mold-board. As the rise of the mold-board is in the direction in which the guide $e$ yields, owing to the nature of the link and lever connections of the latter, the mold-board meets with little resistance as it is raised, while the pressure against it of the guide e, effected by the spring $e^9$, prevents the mold-board from descending by gravity.

Secured at one edge to the frame A' is a curved tension-plate $m^5$. The forming-belt extends between the roller z and tension-plate $m^5$, which latter operates to squeeze the belt slightly between it and the roller, for a purpose hereinafter described.

The foregoing is a description of so much of the machine shown in the drawings as is necessary in the manufacture of cigar-bunches from long-filler tobacco.

Those parts of the machine in the frame A' not yet described relate to mechanism for use in the manufacture of short-filler or of "combination" bunches, and will be described farther on.

The parts, as far as described, co-operate as follows: The drive-shaft B rotates at a comparatively high speed and through its pinion $s'$ and the gear-wheel $B^2$ on the shaft B' transmits to the latter a comparatively slow rotation. The link connection $n^2$, between the crank $B^3$ and bell-crank lever $D^2$, causes the latter to be moved backward and forward with each rotation of the shaft B'. As the bell-crank lever $D^2$ moves forward the rocking frame D is drawn forward by the spring $n^5$ until stopped by contact of the ends of the screws $m^6$ with the roller z. After the rocking frame has stopped the bell-crank lever is swung forward upon its fulcrum a limited distance, its catch-piece $n^3$ in the meantime releasing the bar $D^4$ of the rocking frame and advancing to the position shown in Fig. 6. As the bell-crank lever $D^2$ is returned it swings upon its fulcrum until the head $n^4$ of the catch-piece $n^3$ engages the bar $D^4$ of the rocking frame, when the latter will be drawn back with the lever $D^2$. In the advance of the bell-crank lever $D^2$, as described, through the medium of the link $G^2$, it swings down the lever G' against the resistance of a spring $a^3$ on the frame A', (see Fig. 4,) to be described farther on, which causes the discharger L to descend. In the descent of the lever G', when near the lower limit of its oscillation, its end slides along the downward-projecting arm of the lever H' and swings the latter against the resistance of its weight $H^2$ to turn and advance the rock-shaft I. In the return movement of the bell-crank lever $D^2$ the lever G' is swung upward on its fulcrum and the rod $G^3$ and plunger L are raised by the action of the spring $a^3$, the lever G' in the meantime releasing the lever H. The latter is swung back to its normal position by the weighted extension $H^2$, and thus retracts and turns the shaft I to its initial position. As the rocking frame D is being oscillated in the forward direction, as described, its arm $D^7$ swings downward, drawing down the rod K' and, through the latter, the upper arm of the bell-crank lever K, whereby the lower arm of that lever is swung outward to swing the lever P and advance the carriage O into the machine, which, as described, thus carries the receptacle or mold O' into the position to receive the descending plunger L. The plunger L does not in its descent reach the mold O' until after the rocking frame D has been stopped by contact of the stop-screws $m^6$ with the roller z. The reciprocation of the plunger into and out of the mold O' is produced by the oscillation of the bell-crank lever $D^2$ on its fulcrum, while the rocking frame D is stationary in its forward position, and during this period, consequently, the mold O' remains immovable in the machine. In the advance or forward oscillation of the rocking frame D it slides the sliding plate p (through the medium of the link $p^2$) forward on the rock-shaft E. In this movement of the sliding plate p the vertical rock-shaft F, owing to its link connection $p'$ with the plate p, is turned to swing the carrier-frame R around from its vertical position, adjacent to the rocking frame D, to its horizontal position at the mold-board T, as before described. As the sliding plate p nears the forward limit of its reciprocation the plate o at its cam-slot $o'$ turns the rock-shaft E in the direction which causes the pawl $E^3$ to descend and engage the next lower mold or cavity of the mold-board T. In the return or backward movement of the rocking frame D the plate p is slid in a backward direction, which turns the rock-shaft F to swing the carrier R to its position in the vertical plane, in which position, as described, the pivotal jaw of the shaper R' is open, ready to receive a cigar-bunch, and as the plate p nears the backward limit of its reciprocation the rock-shaft E is turned by the plate o in the direction which moves the pawl $E^3$ upward and, as described, raises the mold-board T the distance of one mold.

To employ the machine to the best advantage in making long-filler cigar-bunches, at least two operators should be in attendance, one standing at the table N with his foot upon the treadle to work the same if foot-power is employed or to control the starting and stoppage thereof if the power is applied at the pulley X. The operator at the table N is supplied with a quantity of inside wrappers or binders trimmed to the desired shape, which he is to feed to the machine at the proper times, as will appear later on. The second operator stands at the table $M^3$, upon which is dumped a quantity of long-filler tobacco. Every time the carriage O moves outward to the position shown in Fig. 5 he fills the receptacle or mold O' with the tobacco, being careful that the strips extend longitudinally of the mold and are not intertwined. The mold O' being filled with tobacco, as described, the operation of the machine to form a cigar-bunch is as follows:

The initial positions of the various features of the machine would be the following: The carriage O is advanced and the mold O' in position to receive the descending discharging-plunger L, which is in its raised position on the point of starting downward. The rocking frame D is at the forward limit of its oscillation, with the opening $m'$ (between the platform $m$ and angle-plate $m^2$) directly under the mold. The forming-belt $k$ extends flat across the platform $m$ and is looped between the roller $z$ and angle-plate $m^2$, (in the space afforded by the stop-screws $m^6$.) A sheet of inside wrapper or binder Z lies upon the plate N', with one edge portion resting upon the forming-belt in the path of the plunger L, all as shown in Fig. 6. The carrier R is in the horizontal position shown in Figs. 10 and 11, with its jaws closed. The ejector $R^2$ is back, the reciprocating rock-shaft I being on the point of turning to engage the stop $f^2$, with its catch-piece $I^3$, and the pawl $E^3$ is at the lowest limit of its play. With the first subsequent movement of the operating mechanism the rock-shaft I turns to engage the stop $f^2$ and plunge the ejector $R^2$ forward through the shaper R' and into the respective mold of the mold-board T, as shown in Fig. 12. The shaft I then retreats and turns back to its initial position, leaving the ejector in its advanced position. In the meantime the plunger L descends to the position shown in Fig. 7, crowding the filler contained in the mold O' down through the trap-door $j^4$ upon the wrapper Z and forcing the slack of the forming-belt $k$ down into the opening $m'$, to afford a pocket, of which the plates $j$ constitute the ends and in which the filler rests upon the edge of the binder, the plunger L rises to its initial position, and the trap-door $j^4$ closes. The next succeeding movements of the operating mechanism produce the following simultaneous movements of the parts: The rocking frame D oscillates in the backward direction, causing the forming-belt to afford a nearly-closed loop between the roller $z$ and platform $m$, in which the filler and its binder are squeezed and rolled in the movement of the frame D, as shown in Fig. 8, until the outer or forward edge of the platform $m$ passes the roller $z$, when the loop of the forming-belt opens, (see Fig. 9,) and the crude bunch thus formed drops out. The carrier-frame R is swung around and turned to the vertical position, the ejector $R^2$ drops to its initial position, and the jaw $h^3$ of the shaper R' is opened by contact of its projection $h^8$ with the stop $h^{10}$, Fig. 16, and the shaper thus at the proper time is in position (see Fig. 9) to receive the bunch as the latter falls from the forming-belt. With the first backward motion of the rocking frame D the carriage O moves out of the machine over the platform M'. The operator may commence to refill the mold on the instant the latter leaves the side of the frame A' and may continue the filling operation until the mold is returned to the frame A', which gives him ample time to complete the operation. In the final backward motion of the rocking frame D the pawl $E^3$ is reciprocated upward to raise the mold-board T and bring one of the cavities thereof into position. Starting with the forward or return oscillation of the rocking frame D, the carrier R swings toward its initial position. As it turns from the vertical plane the jaw $h^3$ closes against the bunch, which is thus squeezed in the shaper R' to the desired form, which is also the shape and size of the cavities of the mold-board. After the carrier has reached its final position, which is also its initial position, the forward plunge, as described, of the ejector $R^2$, forces the bunch from the shaper and rams it into the cavity of the mold-board at the same time that the filler for the cigar-bunch next to be formed is being ejected by the plunger L from the mold O'. Thus the operation of the machine may be continuous from the time that a mold-board is placed in the machine until all its cavities are filled, and it is only necessary to stop the machine long enough to take out the filled mold-board and insert an empty one, an operation which requires but a few seconds.

In the upper part of the machine, supported in the frame A', is automatic feed mechanism for short-filler tobacco, and which is brought into operation only when short-filler cigar-bunches or combination cigar-bunches are to be made in the machine.

Figure 2:
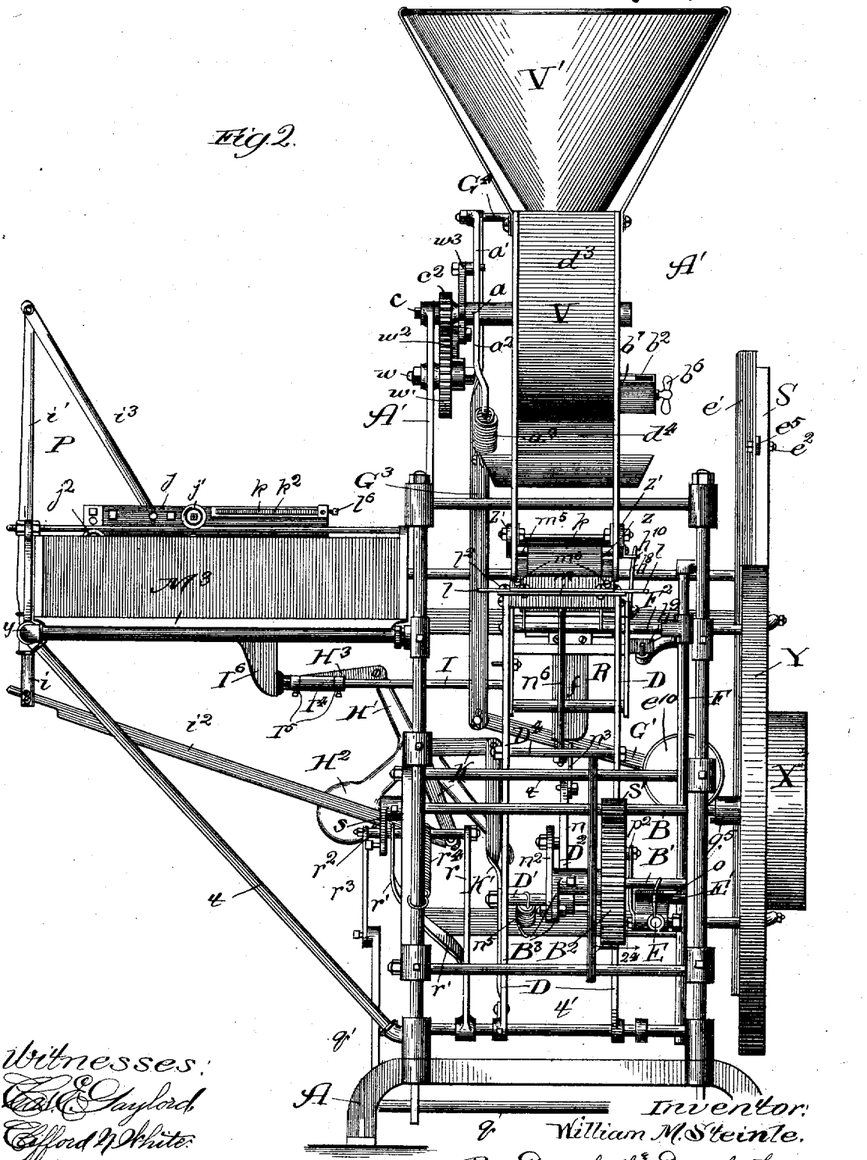
Fig. 2, a rear elevation thereof.
Figure 3:
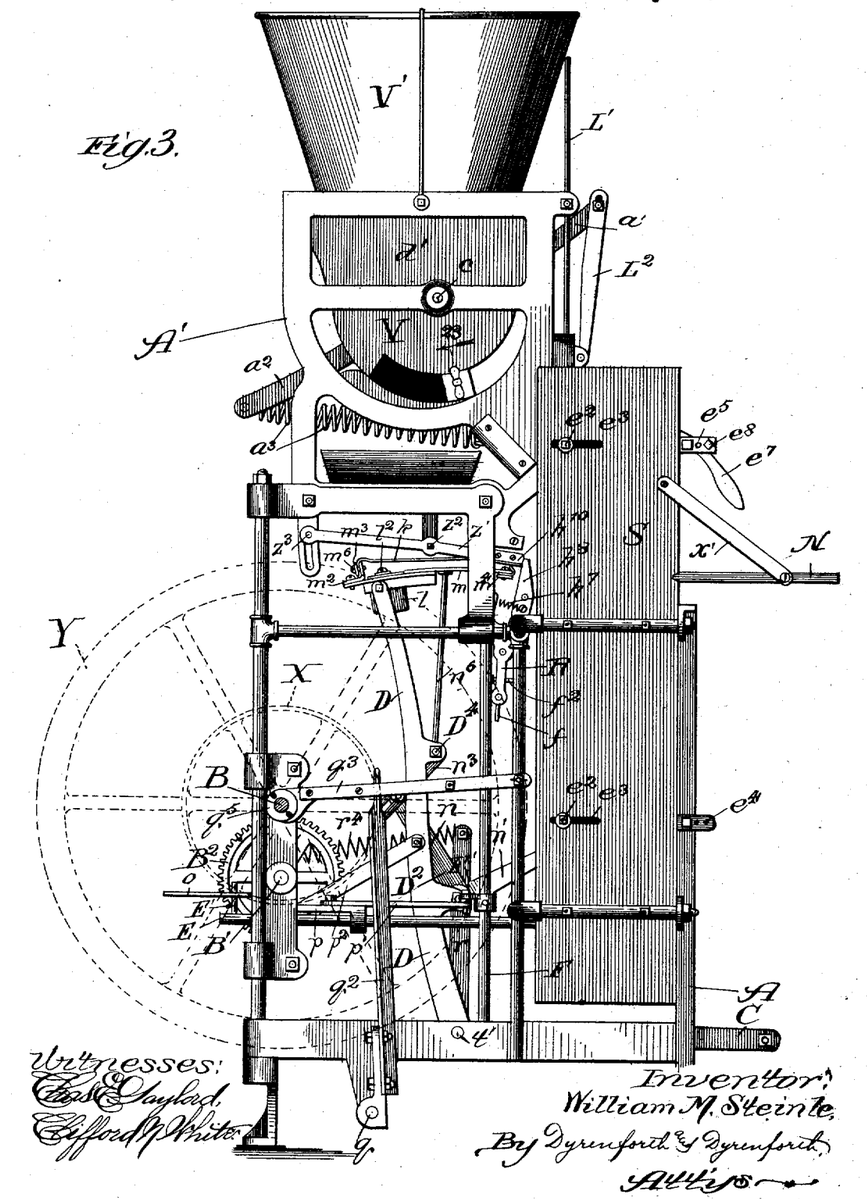
Fig. 3, a view in elevation of the left-hand side of the machine.
Figure 22:
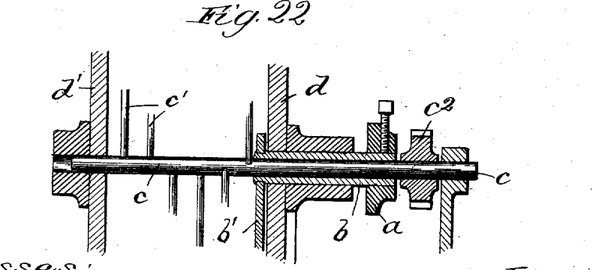
Fig. 22, an enlarged broken section taken on line 22 of Fig. 6 and viewed as indicated.
Figures 23, 25:
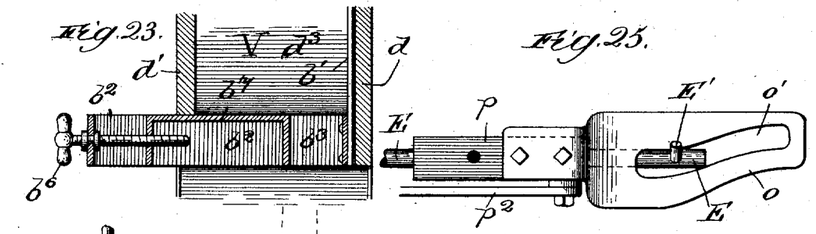
Fig. 23, an enlarged broken section taken on line 23 of Fig. 3 and viewed in the direction of the arrow.
Fig. 25, a broken top plan view of certain of the features shown in Fig. 24 at the right-hand side thereof.
Figure 24:
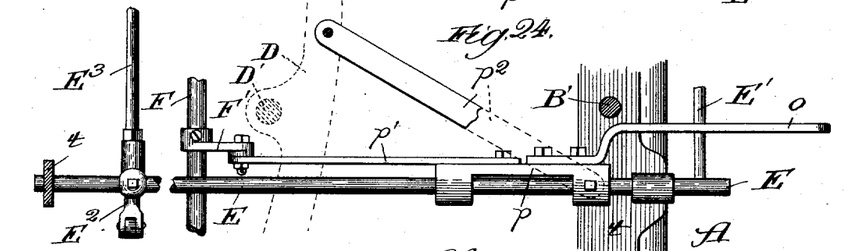
Fig. 24, a broken and enlarged sectional view on line 24 of Fig. 2, viewed in the direction of the arrow.
Figure 26:
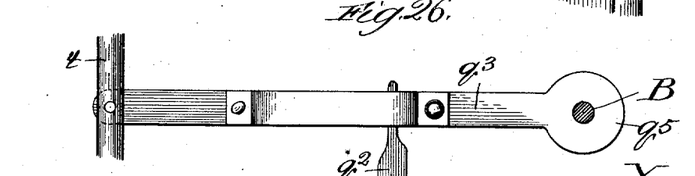
Fig. 26, a broken sectional elevation of details of the construction, illustrating a portion of the shipper mechanism for the clutch on the drive-shaft.

In the upper part of the frame A' is a reservoir V, surmounted by a hopper V'. The reservoir V is itself shaped to afford a hopper by being rounded at the lower end portion from the front and back to the center, which is therefore also the lowest point. It has two flat side plates $d$ and $d'$, a curved front plate $d^2$, which for some distance from the top is secured at its edges to the edges of the side plates and then curved downward and inward between the side plates, terminating short of the center of the base of the reservoir and a short distance above the lower edges of the side plates, as shown in Fig. 6, and a back plate $d^3$, which, commencing at the top of the side plates, follows in the plane of the outlines of the latter to the center of the base portion, and thence extends downward in an inclined plane to afford the chute $d^4$, which terminates back of and adjacent to the path of the plunger L, close to the plane of the top of the mold O'. Inside the reservoir is a partition-plate $d^5$, which extends close to the front plate $d^2$ in a plane nearly parallel with the latter and terminates at about the center of the reservoir. The lower edge of the plate $d^5$ and upper edge of the chute $d^4$ afford between them an approximately vertical outlet-opening at the bottom of the reservoir. Down as far as the lower end of the front plate $d^2$ the plate $d^5$ is secured at both its lateral edges to the side plates; but beyond the lower edge of the front plate it is cut away at the side adjacent to the plate $d$ to afford a slot (not shown) for the passage of a swinging arm $b'$, hereinafter described. Extending through bearings in the side plates $d$ $d'$ is a shaft $c$, and upon the shaft extending through the bearing in the side plate $d$ is a loose sleeve $b$. Within the reservoir the shaft $c$ is provided with a series of radial arms or stirrers $c'$, (see Figs. 6 and 22,) and the sleeve $b$ carries, also within the reservoir and close to the side plate $d$, a laterally-extending arm $b'$. Carried by the arm $b'$ at its lower end is a valve $b^2$, comprising a box extending transversely of the reservoir and open at its upper and lower sides to afford a passage $b^3$ and provided with wing-plates $b^4$ and $b^5$, extending laterally from its sides. The wing $b^5$ affords a raised bottom for the rear portion of the reservoir and both wings move with the box, as hereinafter described. In the said movement the wing $b^4$ slides upon the under side of the partition $d^5$, between the latter and the front plate $d^2$, and the wing $b^5$ slides at its free edge against the surface of the back plate $d^3$. The box portion of the valve $b^2$ at one end projects beyond the side of the reservoir, as shown in Figs. 2 and 23, and the lower portion of the side plate $d'$ is cut away, as shown in Fig. 3, to permit the box to swing freely. In the passage $b^3$ through the box and adjustable therein by means of a thumb-screw $b^6$ in the end of the box is an auxiliary slide-valve $b^7$. The valve $b^7$ may be adjusted to close the passage $b^3$ or to open the latter from the end of the box opposite the set-screw to any desired extent. Fastened between its ends to the sleeve $b$ outside the reservoir is a lever $a$, one arm $a'$ of which is pivotally connected with the upper end of the vertically-reciprocating bar $G^3$, and at the end of its arm $a^2$ the lever is connected with the end of a spring $a^3$, which at its opposite end is fastened to the frame $A'$. A short shaft $w$ is journaled in the frame $A'$ just below the shaft $c$ and carries a gear-wheel $w'$, which meshes with a pinion $c^2$ on the shaft $c$. Upon the gear-wheel $w'$ is an arm $w^2$, which at its free end is pivotally connected with the arm $a'$ of the lever $a$ by a link $w^3$. As the lever $a$ is reciprocated downward by the bar $G^3$ it turns the sleeve $b$, and consequently the arm $b'$ and box $b^2$, with its wings, backward beyond the position shown in Fig. 6. At the same time the arm $w^2$ is swung down to rock the gear-wheel $w'$ and through the latter and the pinion $c^2$ to turn the shaft $c$ and stirrers $c'$ in a direction contrary to the simultaneous movement of the sleeve $b$ and its connections. On the face of the chute $d^4$ are two downward-converging guide-flanges $d^7$, and between the latter, toward the side nearest the plate $d$, is an adjustable deflector or dividing-ridge $d^6$. The deflector is pivoted to the chute at its upper end and may be swung at its lower end toward either guide $d^7$.

When the machine is to be employed for making short-filler bunches, the rod $i^2$ is disconnected from the lever K and the carriage O pushed into the machine to cause the mold O' to remain permanently in its place under the plunger L. The reservoir V is filled through the hopper V' with short-filler tobacco, and the frame $b^2$ being at the backward limit of its play the passage $b^3$ is filled. The auxiliary valve $b^7$ is adjusted so that the passage $b^3$ will hold just the quantity of the filler-tobacco necessary for one cigar-bunch. Only one operator is necessary to manage the machine, and he stands at the table N, as before described, to feed the inside wrappers or binders to the machine. In the ascent of the plunger L the frame $b^2$ is swung forward and the contents of the passage $b^3$ are discharged upon the chute $d^4$, whence they descend into the mold O', the divider $d^6$ causing the filler to be distributed properly in the mold. In the forward movement of the frame $b^2$ the upper end of the passage $b^3$ is gradually shut off from the reservoir V by the partition $d^5$, and the passage is opened at the bottom as it passes the angle of the back plate $d^3$, where it deflects down to afford the chute. The stirrers $c'$ agitate the contents of the receptacle, so that they may fall freely into the passage when the box $b^2$ is returned, and they also operate to cause any foreign particles, as sand and any tobacco-dust which may be mixed with the filler, to settle at the bottom of the reservoir. That portion of the back plate $d^3$ across which the box $b^2$ travels and which closes the passage $b^3$ is provided with perforations $d^8$ to permit the escape of any dust or sand which may descend with the filler into the passage $b^3$. A receptacle $d^9$ may be placed below the said perforations, as shown, to prevent the dust, &c., from falling into the machine. Thus the mold O' is charged automatically with each rise of the plunger L, and excepting that the carriage does not move the operations of all the parts are the same as described for the production of cigar-bunches from long-filler tobacco.

Those features of the machine with which the tobacco comes into immediate contact and which apportion the latter and shape the bunch may be adjusted to the requirements of a cigar of any required size or shape. Thus by loosening the jam-screws $j^6$ on the carriage-frame and inserting a core of the proper dimensions between the faces of the mold O' the plates $k^2$ may be pressed against the core and again tightened in position, so that when the core is removed the mold or receptacle O' will have just the capacity necessary to receive the quantity of filler-tobacco required for the pupose of the particular cigar-bunch to be produced and will be of the shape necessary to effect the required distribution of the filler-tobacco to afford a cigar-bunch of the desired form. The plunger L, which is secured at its upper end portion between the jaws of a screw-clamp on the end of the stem L', (see Figs. 1 and 6,) may be readily removed and replaced with another plunger-head L, of the proper dimensions to enter the mold and eject all the tobacco therefrom. As it is not necessary in practice that the plunger-head should conform very closely in shape and size to the mold O', it will only be necessary to interchange plungers L when cigar-bunches which differ materially in size or shape from those last produced are to be made. The connection between the stem L' and link L² permits the plunger to be adjusted longitudinally for the purpose of regulating the distance of its plunge.

The forming-belt $k$ should correspond in width with the length of the cigar-bunch, and owing to the clamping-strips $m^3$ $m^4$ and their set-screws it may, when desired, be unfastened at its ends and removed and replaced by another. The belt may also be lengthened or shortened, as required, to effect the proper degree of pressure upon bunches of various thicknesses, and to the same purpose the pivotal adjusting-frame $z'$ may be loosened in the guide at its rear end to adjust the roller $z$ with relation to the platform $m$ and tightened again. The plates $l$ should be brought to the edges of the forming-belt employed to close the ends of the pocket as the filler is rammed into the latter by the plunger, and thus prevent the loss of any of the tobacco before it is held by the pressure of the loop.

The object of the shaper R' is to compress the cigar-bunch into the proper form to enter the molds or cavities of the mold-board employed, and thereby incidentally to prevent danger of injury to the binder as the bunch is rammed into its mold. The plates, therefore, of the shaper R' must be adjusted relatively to produce a shaper of approximately the same form and size as the cavities of the mold-board employed. The head or block $f'$ of the ejector R² should conform with reasonable closeness to the form and size of the shaper, and it is held to the stem $f$ by adjustable clamps (see Figs. 10, 11, and 12) to permit its removal and replacement by another block when desired.

The plate $m^5$ by pressing the forming-belt against the roller $z$ produces sufficient tension to cause the slack of the forming-belt to be gathered behind the roller $z$ in the forward oscillation of the rocking frame D, whereby when the plunger descends the pocket is formed altogether by drawing the belt from the direction of the back of the frame. This makes it possible to feed the binder with required exactness, so that its edge will, when the pocket is formed, be in the position from which it will roll about the filler without wrinkling. The plate $m^5$ also operates to direct the filler as it is forced down by the plunger L.

The mold O', which gages the quantity of the filler and insures the proper disposition thereof, the forming-belt, and shaper all act positively and co-operate to produce cigar-bunches which will not vary materially in size, shape, or density, and a given number of bunches will be much more uniform in all these respects than it is possible to make them by hand or with any other machine of which I am aware. In making long-filler bunches the tobacco will never be intertwined so as to interfere with the draft of the cigar—a fault frequently existing even with cigars made by the hands of the best skilled operators.

Figures 27, 28:
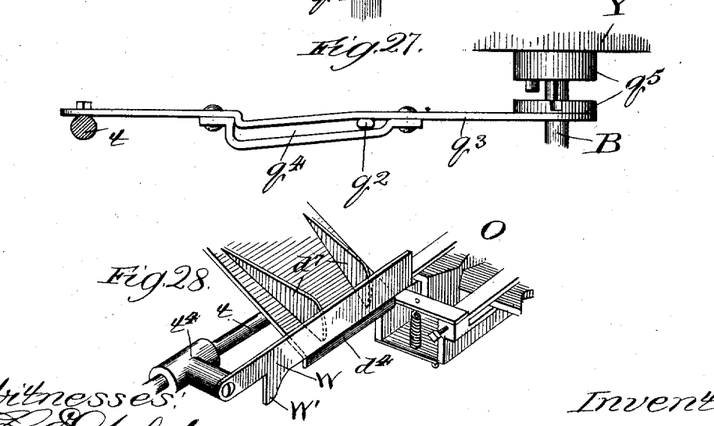
Fig. 27, a broken top plan view of the details shown in Fig. 26.
Fig. 28, a broken perspective view showing an additional feature, and Fig. 29 a broken partly-sectional view showing details of the construction.

The feed-valve mechanism shown in Fig. 28 permits the machine to be employed for forming combination or mixed cigar-bunches—that is to say, cigar-bunches consisting of partly long and partly short filler tobacco in proper proportions. To prevent confusion, the mechanism shown in Fig. 28, being simple and readily understood, is left out of other figures where it might have been illustrated.

The mechanism comprises an oblong valve-plate W, of thin metal, pivoted at $t^4$ (see Fig. 1) upon one of the connecting-rods $t$ of the main frame A to the left of the chute $d^4$. The lower edge of the plate W, along its free end portion, extends normally across the discharge end of the chute $d^4$ in front of the ends of the guide-flanges $d^7$ and rests upon the lower edge portion of the chute. Between the chute and its pivoted end the valve-plate W is provided with a cam projection W', which extends into the path of the end of the carriage O. As the carriage is reciprocated into the machine and the mold O', carried by it, is advanced to its position below the chute the end of the carriage strikes the cam projection W' and raises the valve-plate on its pivot from the chute. With the first movement of the carriage in the outward direction the cam projection W' is released and the valve-plate drops to its normal position and closes the lower end of the chute. Thus in the outward reciprocation of the carriage, and while the mold is being supplied with long-filler tobacco, the feed mechanism at the reservoir V discharges the desired quantity of short-filler tobacco upon the chute, (being regulated as before described,) which runs down to the lower end of the latter, whence it is prevented from escaping by the valve-plate W. As the mold O' advances into position below the chute the valve-plate W is raised, permitting the short-filler tobacco held in check thereby to fall into the mold upon the long filler. In the subsequent operations of the machine the long and short filler tobacco are rolled together in a binder, and thus afford a mixed or combination bunch.

What I claim as new, and desire to secure by Letters Patent, is—

1. A combined and convertible long-filler and short-filler cigar-bunch machine, comprising, in combination with the bunch-rolling mechanism, an initial receptacle for the filler, means for reciprocating the said receptacle between its long-filler receiving position and its discharge position in the machine, feed mechanism for short filler over the path of the receptacle, and detachable means for actuating the said feed mechanism at proper intervals, whereby the machine may be employed for forming cigar-bunches with either or both long-filler and short-filler tobacco, substantially as described.

2. A combined and convertible long-filler and short-filler cigar-bunch machine, comprising, in combination with the bunch-rolling mechanism, an initial receptacle for the filler, means for reciprocating the said receptacle between its long-filler receiving position and its discharge position in the machine, and feeding mechanism for short filler above the said discharge position of the receptacle, whereby the machine may be employed for forming cigar-bunches with either or both long-filler and short-filler tobacco, substantially as described.

3. A combined and convertible long-filler and short-filler cigar-bunch machine, comprising, in combination with the bunch-rolling mechanism, an initial receptacle for the filler, detachable means for reciprocating the said receptacle between its long-filler receiving position and its discharge position in the machine, and feeding mechanism for short filler above the said discharge position of the receptacle, whereby the machine may be employed for forming cigar-bunches with either or both long-filler and short-filler tobacco, substantially as described.

4. In a cigar-bunch machine, the combination, with the bunch-rolling mechanism, of an initial receptacle for the filler, a reservoir for filler-tobacco, provided with an opening in its lower side, a chute extending from said opening and terminating over the receptacle, valve mechanism at the said opening to discharge at intervals filler from the reservoir upon the chute, a deflector upon the chute for dividing and distributing the filler in the said receptacle, and a discharger operating to transfer the filler from the receptacle to the bunch-rolling mechanism, substantially as described.

5. In a cigar-bunch machine, the combination, with the bunch-rolling mechanism and initial receptacle for the filler, of mechanism above the receptacle, operated from the driving-power of the machine to feed the filler at intervals to the receptacle, consisting of a reservoir having an opening in its lower side, a chute extending from said opening and terminating over the receptacle, a valve at the said opening, comprising a box having a passage through it provided with an auxiliary valve for controlling the size of the passage and movable into and out of the said opening, whereby the passage is filled through its upper end as the box enters the reservoir and discharged through its lower end as the box advances out of the reservoir, a deflector upon the said chute for dividing and distributing the filler in the said receptacle, and a discharger operating to transfer the filler from the receptacle into the bunch-rolling mechanism, substantially as described.

6. In a cigar-bunch machine, the combination, with the bunch-rolling mechanism and initial receptacle for the filler, of mechanism above the receptacle, operated from the driving-power of the machine to feed the filler at intervals to the receptacle, consisting of a reservoir having an opening in its lower side, a valve in said opening, comprising a box having a passage through it, with an auxiliary valve for controlling the size of the passage, and having a wing-plate $b^5$ extending into the reservoir and forming a false bottom therein, the box being operated to reciprocate into and out of the said opening, whereby the passage is filled through its upper end as the box enters the reservoir and discharged through its lower end as the box advances out of the reservoir, and stirring mechanism in the reservoir, substantially as and for the purpose set forth.

7. In a cigar-bunch machine, the combination, with the bunch-rolling mechanism and final receptacle for the bunch, of a movable carrier operated from the driving-power of the machine to transfer the bunch from the bunch-rolling mechanism to the final receptacle and comprising a frame provided with a stationary and a pivotal jaw, the jaws affording between them a receptacle for the bunch, a spring upon the frame maintaining the jaws normally closed, a projection upon the pivotal jaw, and a stationary stop in the path of the said projection, whereby the pivotal jaw is opened by contact of its projection with the said stop and closed by the spring in the movement of the carrier, and ejecting mechanism, substantially as described, for discharging the bunch from the carrier into the final receptacle, as set forth.

8. In a cigar-bunch machine, the combination, with the bunch-forming mechanism, carrier R, and ejector, of a vertically-disposed mold-board T, a frame in which the mold-board is yieldingly supported at its lateral edges to move freely in an upward direction and be resisted in its movement in a downward direction, a guide-wheel $e^{10}$, bearing against the front side of the mold-board, and intermittent raising mechanism for the mold-board, comprising a pawl to engage the mold-board at its cavities and a rock-shaft with which the pawl is pivotally connected, actuated from the driving-power of the machine to reciprocate the pawl and raise the mold-board the distance of one cavity with each operation, substantially as and for the purpose set forth.

9. In a cigar-bunch machine, the combination, with the bunch-rolling mechanism and driving-power of the machine, of a receptacle for the filler, mounted upon a movable carrier reciprocating across a vertical plane between the long-filler feeding position and the discharge position of the receptacle, and feed mechanism for short-filler tobacco above the said discharge position of the receptacle, automatically actuated as the receptacle nears the discharge position to feed short-filler to the receptacle, substantially as described.

10. In a cigar-bunch machine, the combination, with the bunch-rolling mechanism, the initial receptacle upon a reciprocating carrier, the reservoir for short-filler tobacco, and intermittingly-operating discharge mechanism therefor, all operated from the driving-power of the machine, and the chute extending downward from the said reservoir over the path of the reciprocated receptacle, of a valve W, normally blocking the lower end of the chute and provided with a projection, which extends normally into the path of the reciprocating carrier to be actuated by the movement thereof to open the valve W, substantially as and for the purpose set forth.

WILLIAM M. STEINLE.

In presence of—
  J. H. DRYENFORTH,
  M. J. FROST.